(12) United States Patent
Fu et al.

(10) Patent No.: US 11,187,874 B2
(45) Date of Patent: Nov. 30, 2021

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventors: Tao Fu, ShenZhen (CN); An-Kai Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 197 days.

(21) Appl. No.: 16/299,262

(22) Filed: Mar. 12, 2019

(65) Prior Publication Data

US 2020/0073086 A1 Mar. 5, 2020

(30) Foreign Application Priority Data

Aug. 28, 2018 (CN) .......................... 201810988950.8

(51) Int. Cl.

| G02B 9/00 | (2006.01) |
|---|---|
| G02B 9/64 | (2006.01) |
| H04N 5/225 | (2006.01) |
| H04N 5/232 | (2006.01) |
| G02B 13/06 | (2006.01) |

(52) U.S. Cl.
CPC .............. *G02B 9/64* (2013.01); *G02B 13/06* (2013.01); *H04N 5/2254* (2013.01); *H04N 5/23238* (2013.01)

(58) Field of Classification Search
CPC ...... G02B 9/64; G02B 13/06; G02B 13/0045; G02B 13/18; H04N 5/2254; H04N 5/23238
USPC .......................................... 359/681, 754, 755
See application file for complete search history.

(56) References Cited

U.S. PATENT DOCUMENTS

| 10,310,255 B2 * | 6/2019 | Tashiro | G02B 15/163 |
| 2012/0268832 A1 * | 10/2012 | Chen | G02B 15/173 |
| | | | 359/686 |
| 2017/0108671 A1 * | 4/2017 | Eguchi | G02B 13/0045 |

FOREIGN PATENT DOCUMENTS

| CN | 205157870 U | * | 4/2016 |
| JP | 201776041 A | | 4/2017 |

\* cited by examiner

*Primary Examiner* — Mahidere S Sahle
(74) *Attorney, Agent, or Firm* — McClure, Qualey & Rodack, LLP

(57) ABSTRACT

A wide-angle lens assembly includes a first lens, a second lens, a third lens, a fourth lens, a fifth lens, a sixth lens, a seventh lens, an eighth lens, and a ninth lens. The first lens has negative refractive power and includes a concave surface facing an image side. The second lens has negative refractive power and includes a concave surface facing the image side. The third lens has negative refractive power and includes a concave surface facing the image side. The fourth, fifth, seventh and eighth lenses have refractive power. The sixth and ninth lenses are biconvex lenses with positive refractive power. The first to ninth lenses are arranged in order from an object side to the image side along an optical axis.

20 Claims, 12 Drawing Sheets

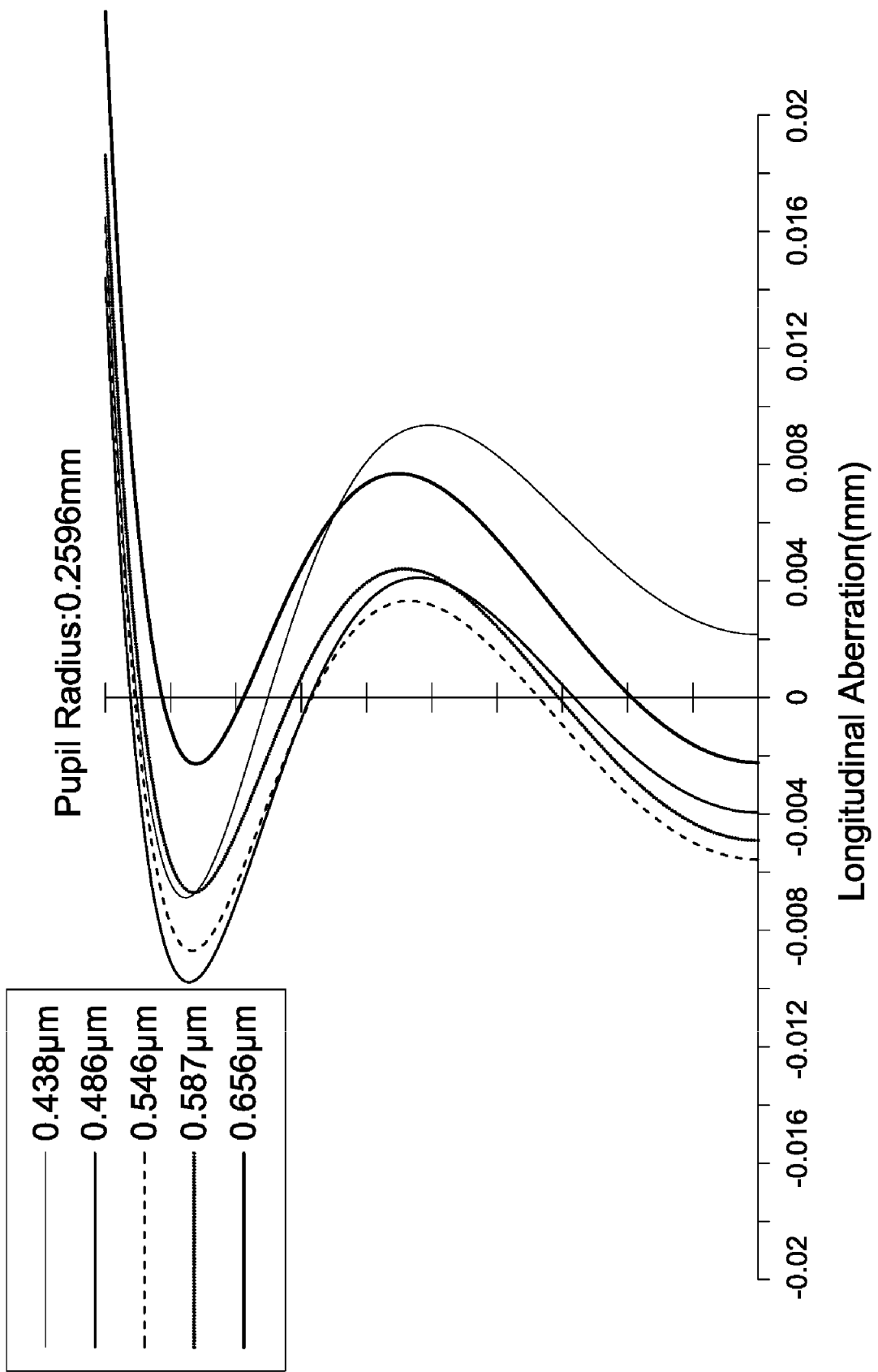

WIDE-ANGLE LENS ASSEMBLY

CROSS REFERENCE TO RELATED APPLICATIONS

This application claims priority of China Patent Application No. 201810988950.8, filed on Aug. 28, 2018, the entirety of which is incorporated by reference herein.

BACKGROUND OF THE INVENTION

Field of the Invention

The present disclosure is related to a wide-angle lens assembly.

Description of the Related Art

The development of wide-angle lens assemblies nowadays is tending toward having a large view angle and a large aperture. Moreover, such a lens assembly is also required to have a short total length, a small bore and be capable of avoiding being effected by the variations in ambient temperature according to a variety of application requirements. However, the wide-angle lens assemblies known in the art have already not fit the requirements now. Therefore, there is a need to provide a wide-angle lens assembly with another configuration that has a large view angle, a large aperture, a short total length and a small bore and is also capable of being prevented from being effected by the variation in ambient temperature.

BRIEF SUMMARY OF THE INVENTION

For the this reason, the present disclosure provides a wide-angle lens assembly that has a large view angle, a small aperture value, a short total length and a small bore and is capable of being prevented from being effected by the variation in ambient temperature, and achieving great optical performance.

According to an embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a convex surface facing an object side and a concave surface facing an image side. The second lens has negative refractive power and includes a convex surface facing the object side and a concave surface facing the image side. The third lens has negative refractive power and includes a convex surface facing the object side and a concave surface facing the image side. The fourth and seventh lenses are biconcave lenses and have negative refractive power. The fifth, sixth and ninth lenses are biconvex lenses and have positive refractive power. The eighth lens has positive refractive power. The first to ninth lenses are arranged in order from the object side to the image side along an optical axis.

According to another embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a concave surface facing an image side. The second lens has negative refractive power and includes a concave surface facing the image side. The third lens has negative refractive power and includes a concave surface facing the image side. The fourth, fifth, seventh and eighth lenses have refractive power. The sixth and ninth lenses are biconvex lenses and have positive refractive power. The first to ninth lenses are arranged in order from the object side to the image side along an optical axis. Moreover, the wide-angle lens assembly satisfies the following condition:

$$-15 < f_1/f < -11.5,$$

wherein $f_1$ is the focal length of the first lens, and f is the effective focal length of the wide-angle lens assembly.

According to yet another embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a concave surface facing an image side. The second lens has negative refractive power and includes a concave surface facing the image side. The third lens has negative refractive power and includes a concave surface facing the image side. The fourth, fifth, seventh and eighth lenses have refractive power. The sixth and ninth lenses are biconvex lenses and have positive refractive power. The first to ninth lenses are arranged in order from the object side to the image side along an optical axis. Moreover, the wide-angle lens assembly satisfies the following condition:

$$-10 < f_2/f < -5.5,$$

wherein $f_2$ is the focal length of the second lens, and f is the effective focal length of the wide-angle lens assembly.

According to yet another embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a concave surface facing an image side. The second lens has negative refractive power and includes a concave surface facing the image side. The third lens has negative refractive power and includes a concave surface facing the image side. The fourth, fifth, seventh and eighth lenses have refractive power. The sixth and ninth lenses are biconvex lenses and have positive refractive power. The first to ninth lenses are arranged in order from the object side to the image side along an optical axis. Moreover, the wide-angle lens assembly satisfies the following condition:

$$-5 < f_3/f < -1.5,$$

wherein $f_3$ is the focal length of the third lens, and f is the effective focal length of the wide-angle lens assembly.

According to yet another embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a concave surface facing an image side. The second lens has negative refractive power and includes a concave surface facing the image side. The third lens has negative refractive power and includes a concave surface facing the image side. The fourth, fifth, seventh and eighth lenses have refractive power. The sixth and ninth lenses are biconvex lenses and have positive refractive power. The first to ninth lenses are arranged in order from the object side to the image side along an optical axis. Moreover, the wide-angle lens assembly satisfies the following condition:

$$0.8 < TTL/D_1 < 1.2,$$

wherein TTL is the distance between the object-side surface of the first lens and an imaging surface along the optical axis, and $D_1$ is the effective diameter of the first lens.

In one of the above embodiments, the fourth lens and the fifth lens are cemented together.

In one of the above embodiments, the seventh lens and the eighth lens are cemented together.

In one of the above embodiments, the eighth lens includes a convex surface facing the object side and a flat surface facing the image side.

In one of the above embodiments, the eighth lens is a biconvex lens.

In one of the above embodiments, the third lens, the sixth lens and the ninth lens are aspheric lenses.

In one of the above embodiments, the wide-angle lens assembly further satisfies the following condition:

$$-15 < f_1/f < -11.5,$$

wherein $f_1$ is the focal length of the first lens, and f is the effective focal length of the wide-angle lens assembly.

In one of the above embodiments, the wide-angle lens assembly further satisfies the following condition:

$$-10 < f_2/f < -5.5,$$

wherein $f_2$ is the focal length of the second lens, and f is the effective focal length of the wide-angle lens assembly.

In one of the above embodiments, the wide-angle lens assembly further satisfies the following condition:

$$-5 < f_3/f < -1.5,$$

wherein $f_3$ is the focal length of the third lens, and f is the effective focal length of the wide-angle lens assembly.

In one of the above embodiments, the wide-angle lens assembly further satisfies the following condition:

$$4.5 < f_9/f < 5.5,$$

wherein $f_9$ is the focal length of the ninth lens, and f is the effective focal length of the wide-angle lens assembly.

In one of the above embodiments, the wide-angle lens assembly further satisfies the following condition:

$$-1.5 < f_{123}/f < -1,$$

wherein $f_{123}$ is the effective focal length of the combination of the first to third lenses, and f is the effective focal length of the wide-angle lens assembly.

In one of the above embodiments, the wide-angle lens assembly further satisfies the following condition:

$$-2 < f_{12345}/f_{6789} < -1,$$

wherein $f_{12345}$ is the effective focal length of the combination of the first to fifth lenses, and $f_{6789}$ is the effective focal length of the combination of the sixth to ninth lenses.

In one of the above embodiments, the wide-angle lens assembly further satisfies the following condition:

$$0.8 < TTL/D_1 < 1.2,$$

wherein TTL is the distance between the object-side surface of the first lens and an imaging surface along the optical axis, and $D_1$ is the effective diameter of the first lens.

Further, sufficiently-strong refractive power may be achieved when the conditions, $-15 < f_1/f < -11.5$, $-10 < f_2/f < -5.5$ and $-5 < f_3/f < -1.5$, are satisfied.

The above objects, features and advantages of the present disclosure will be more clearly understood from the following detailed description taken in conjunction with exemplary embodiments and the accompanying drawings.

BRIEF DESCRIPTION OF THE DRAWINGS

FIG. 4A is a schematic diagram illustrating the longitudinal aberration of the wide-angle lens assembly according to the second embodiment of the present disclosure.

DETAILED DESCRIPTION OF THE INVENTION

Figure 1:
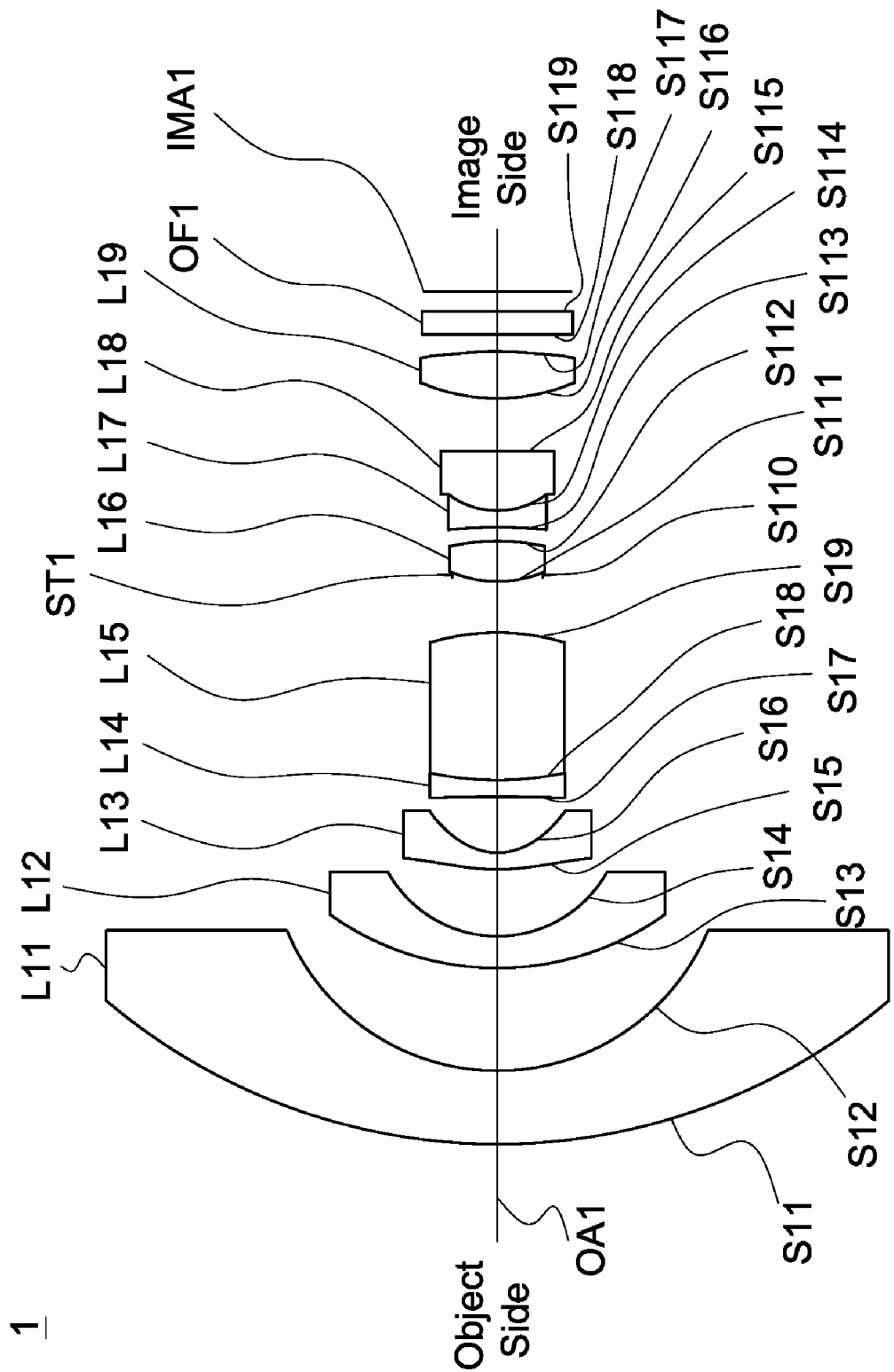
FIG. 1 is a schematic diagram illustrating the lens arrangement of a wide-angle lens assembly according to the first embodiment of the present disclosure.

Please refer to FIG. 1. FIG. 1 is a schematic diagram illustrating the lens arrangement of a wide-angle lens assembly according to the first embodiment of the present disclosure. The wide-angle lens assembly 1 includes a first lens L11, a second lens L12, a third lens L13, a fourth lens L14, a fifth lens L15, an aperture stop ST1, a sixth lens L16, a seventh lens L17, an eighth lens L18, a ninth lens L19 and an optical filter OF1, and these elements are arranged in order from an object side to an image side along an optical axis OA1. During imaging, the light from the object side is imaged on an imaging surface IMA1.

The first lens L11 is a meniscus lens having negative refractive power and made of glass. The object-side surface S11 of the first lens L11 is a convex surface, and the image-side surface S12 of the first lens L11 is a concave surface. The object-side surface S11 and the image-side surface S12 are spherical surfaces.

The second lens L12 is a meniscus lens having negative refractive power and made of glass. The object-side surface S13 of the second lens L12 is a convex surface, and the image-side surface S14 of the second lens L12 is a concave surface. The object-side surface S13 and the image-side surface S14 are spherical surfaces.

The third lens L13 is a meniscus lens having negative refractive power and made of glass. The object-side surface S15 of the third lens L13 is a convex surface, and the image-side surface S16 of the third lens L13 is a concave surface. The object-side surface S15 and the image-side surface S16 are aspherical surfaces.

The fourth lens L14 is a biconcave lens having negative refractive power and made of glass. The object-side surface S17 of the fourth lens L14 is a concave surface, and the image-side surface S18 of the fourth lens L14 is a concave surface. The object-side surface S17 and the image-side surface S18 are spherical surfaces.

The fifth lens L15 is a biconvex lens having positive refractive power and made of glass. The object-side surface S18 of the fifth lens L15 is a convex surface, and the image-side surface S19 of the fifth lens L15 is a convex surface. The object-side surface S18 and the image-side surface S19 are spherical surfaces.

The fourth lens L14 and the fifth lens L15 are cemented together.

The sixth lens L16 is a biconvex lens having positive refractive power and made of glass. The object-side surface S111 of the sixth lens L16 is a convex surface, and the image-side surface S112 of the sixth lens L16 is a convex surface. The object-side surface S111 and the image-side surface S112 are aspherical surfaces.

The seventh lens L17 is a biconcave lens having negative refractive power and made of glass. The object-side surface S113 of the seventh lens L17 is a concave surface, and the image-side surface S114 of the seventh lens L17 is a concave surface. The object-side surface S113 and the image-side surface S114 are spherical surfaces.

The eighth lens L18 is a plano-convex lens having positive refractive power and made of glass. The object-side surface S114 of the eighth lens L18 is a convex surface, and the image-side surface S115 of the eighth lens L18 is a flat surface. The object-side surface S114 is a spherical surfaces.

The seventh lens L17 and the eighth lens L18 are cemented together.

The ninth lens L19 is a biconvex lens having positive refractive power and made of glass. The object-side surface S116 of the ninth lens L19 is a convex surface, and the image-side surface S117 of the ninth lens L19 is a convex surface. The object-side surface S116 and the image-side surface S117 are aspherical surfaces.

The object-side surface S118 and the image-side surface S119 of the optical filter OF1 are flat surfaces.

Furthermore, the wide-angle lens assembly 1 in the first embodiment satisfies one of the following conditions:

$$-15 < fl_1 < -11.5 \quad (1)$$

$$-10 < fl_2/fl < -5.5 \quad (2)$$

$$-5 < fl_3/fl < -1.5 \quad (3)$$

$$4.5 < fl_9/fl < 5.5 \quad (4)$$

$$-1.5 < fl_{123}/fl < -1 \quad (5)$$

$$-2 < fl_{12345}/fl_{6789} < -1 \quad (6)$$

$$0.8 < TTL1/D1_1 < 1.2 \quad (7)$$

wherein $fl_1$ is the focal length of the first lens L11, $fl_2$ is the focal length of the second lens L12, $fl_3$ is the focal length of the third lens L13, $fl_9$ is the focal length of the ninth lens L19, $fl$ is the effective focal length of the wide-angle lens assembly 1, $fl_{123}$ is the effective focal length of the combination of the first lens L11, the second lens L12 and the third lens L13, $fl_{12345}$ is the effective focal length of the combination of the first lens L11, the second lens L12, the third lens L13, the fourth lens L14 and the fifth lens L15, $fl_{6789}$ is the effective focal length of the combination of the sixth lens L16, the seventh lens L17, the eighth lens L18 and the ninth lens L19, TTL1 is the distance between the object-side surface S11 of the first lens L11 and the imaging surface IMA1 along the optical axis OA1, and $D1_1$ is the effective diameter of the first lens L11.

Because of the disposition of the above lenses and the aperture stop ST1 and satisfying one of the conditions (1) to (7), the wide-angle lens assembly 1 may have a wider view angle, a minimized aperture value, a minimized total length and a minimized bore, and may also achieve the effective correction of aberration and be prevented from being effected by the variation in ambient temperature.

Table 1 illustrates the parameters of respective lenses in the wide-angle lens assembly 1 shown in FIG. 1. In Table 1, the effective focal length of the wide-angle lens assembly 1 is about 1.15 mm, the aperture value of the wide-angle lens assembly 1 is 2.0, the total length of the wide-angle lens assembly 1 is about 25.5 mm, and the view angle of the wide-angle lens assembly 1 is about 200 degrees.

TABLE 1

| Surface # | Curvature radius (mm) | Thickness (mm) | Refractive index Nd | Abbe No. Vd | Note |
| --- | --- | --- | --- | --- | --- |
| S11 | 18.300 | 2.200 | 1.80 | 46.57 | First lens L11 |
| S12 | 6.880 | 3.070 | | | |
| S13 | 8.750 | 0.950 | 1.80 | 46.57 | Second lens L12 |
| S14 | 3.790 | 2.000 | | | |
| S15 | 6.470 | 0.500 | 1.75 | 45.43 | Third lens L13 |
| S16 | 1.836 | 1.680 | | | |
| S17 | −51.090 | 0.500 | 1.80 | 46.57 | Fourth lens L14 |
| S18 | 10.100 | 4.400 | 1.85 | 23.79 | Fifth lens L15 |
| S19 | −7.020 | 1.730 | | | |
| S110 | INF | −0.200 | | | Aperture stop ST1 |
| S111 | 3.720 | 1.210 | 1.61 | 57.54 | Sixth lens L16 |
| S112 | −5.310 | 0.410 | | | |
| S113 | −16.360 | 0.500 | 1.85 | 23.79 | Seventh lens L17 |
| S114 | 2.470 | 1.790 | 1.60 | 65.46 | Eighth lens L18 |
| S115 | ∞ | 1.570 | | | |
| S116 | 5.670 | 1.400 | 1.61 | 57.54 | Ninth lens L19 |
| S117 | −8.720 | 0.500 | | | |
| S118 | ∞ | 0.700 | 1.52 | 64.21 | Optical filter OF1 |
| S119 | ∞ | 0.591 | | | |

The respective sag value z of the respective aspherical surface of the respective aspherical lens in Table 1 along the optical axis OA1 is expressed by the following equation:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

wherein c is the curvature of the surface, h is the distance between the optical axis and a point on the lens surface along a direction vertical to the optical axis, k is the conic coefficient, and A to G are the aspheric coefficients.

Table 2 illustrates the parameters of the respective aspherical surface of each lens listed in Table 2, wherein k is the conic constant, and A~G are the aspheric coefficients.

TABLE 2

| Surface # | k | A | B | C | D | E | F | G |
| --- | --- | --- | --- | --- | --- | --- | --- | --- |
| S15 | −9.35 | −1.77E−03 | −1.38E−04 | −1.23E−06 | 2.82E−06 | −1.58E−07 | 0.00E+00 | 0.00E+00 |
| S16 | −0.75 | −6.94E−04 | 2.10E−04 | −4.81E−05 | −3.26E−06 | 4.96E−06 | 0.00E+00 | 0.00E+00 |

TABLE 2-continued

| Surface # | k | A | B | C | D | E | F | G |
|---|---|---|---|---|---|---|---|---|
| S111 | 1.28 | −1.51E−03 | −2.50E−04 | 2.95E−04 | 1.58E−05 | −2.30E−06 | 0.00E+00 | 0.00E+00 |
| S112 | −2.44 | 7.47E−03 | −7.88E−04 | 7.67E−04 | −1.39E−05 | −7.49E−07 | 0.00E+00 | 0.00E+00 |
| S116 | −0.24 | 1.60E−03 | −5.83E−05 | −4.59E−05 | −2.54E−06 | 1.54E−06 | −8.29E−07 | 8.60E−08 |
| S117 | 4.86 | 9.97E−03 | −5.63E−04 | 1.10E−05 | 4.20E−06 | −7.21E−06 | 7.84E−07 | 0.00E+00 |

Table 3 illustrates the parameters for the conditions (1) to (7) and the calculation results of the conditions (1) to (7). From Table 3, the wide-angle lens assembly 1 in the first embodiment can satisfy the conditions (1) to (7).

TABLE 3

| $fl_1$ | −14.93 mm | $fl_2$ | −9.05 mm | $fl_3$ | −3.56 mm |
|---|---|---|---|---|---|
| $fl_9$ | 5.86 mm | $fl$ | 1.15 mm | $fl_{123}$ | −1.52 mm |
| $fl_{12345}$ | −7.07 mm | $fl_{6789}$ | 5.15 mm | TTL1 | 25.5 mm |
| $D1_1$ | 23.5 mm | | | | |
| $fl_1/fl$ | −12.93 | $fl_2/fl$ | −7.84 | $fl_3/fl$ | −3.09 |
| $fl_9/fl$ | 5.07 | $fl_{123}/fl$ | −1.32 | $fl_{12345}/fl_{6789}$ | −1.37 |
| $TTL1/D1_1$ | 1.08 | | | | |

Further, since sufficiently-strong refractive power may hardly be achieved if the calculation result of $fl_1/fl$ in the condition (1) is larger than −11.5, it would be better that the calculation result of $fl_1/f_1$ is smaller than −11.5. Therefore, $-15 < fl_1/fl < -11.5$ is a condition range that is capable of providing sufficiently-strong refractive power when it is satisfied.

Figure 2A:
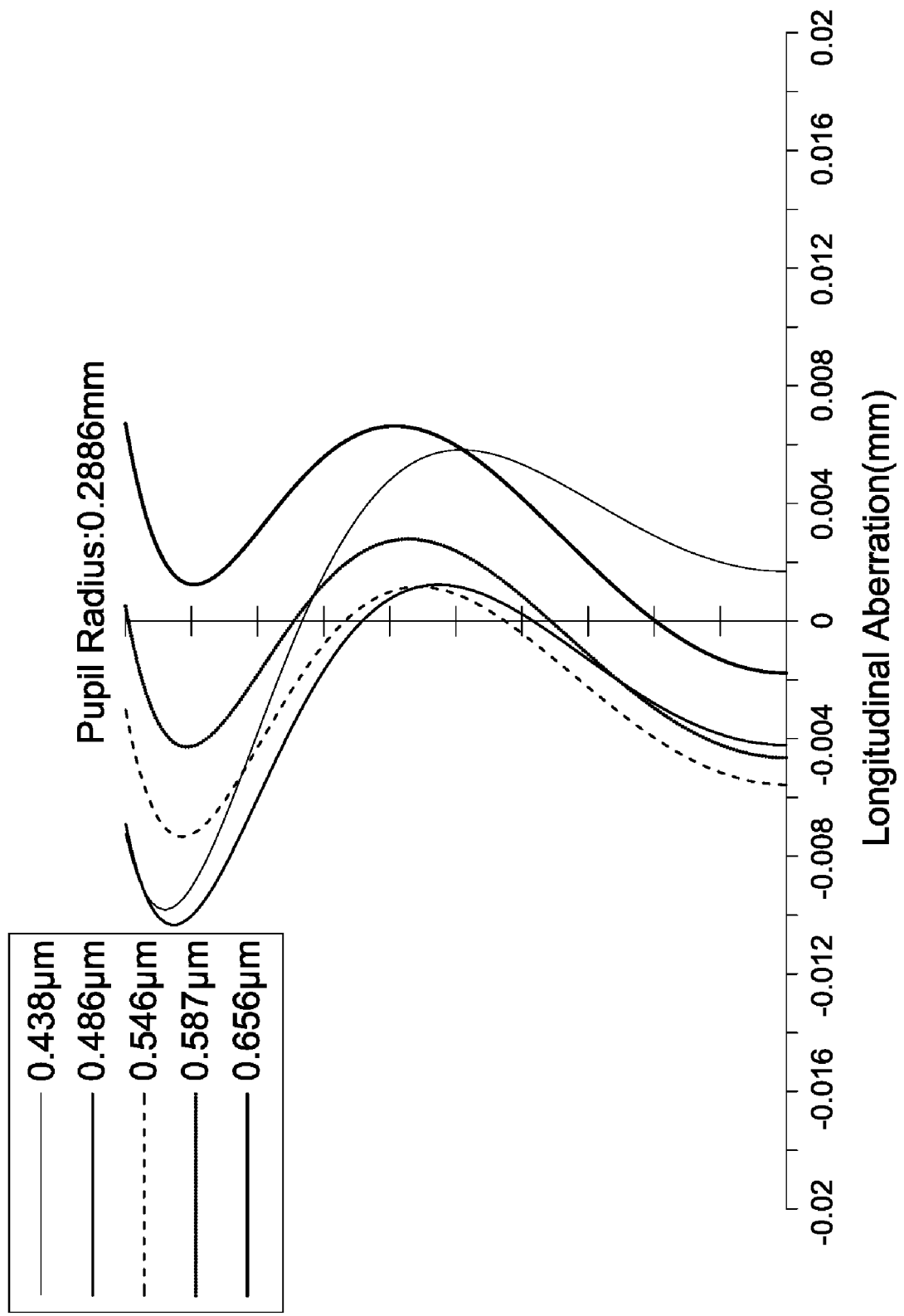
FIG. 2A is a schematic diagram illustrating the longitudinal aberration of the wide-angle lens assembly according to the first embodiment of the present disclosure.
Figure 2B:
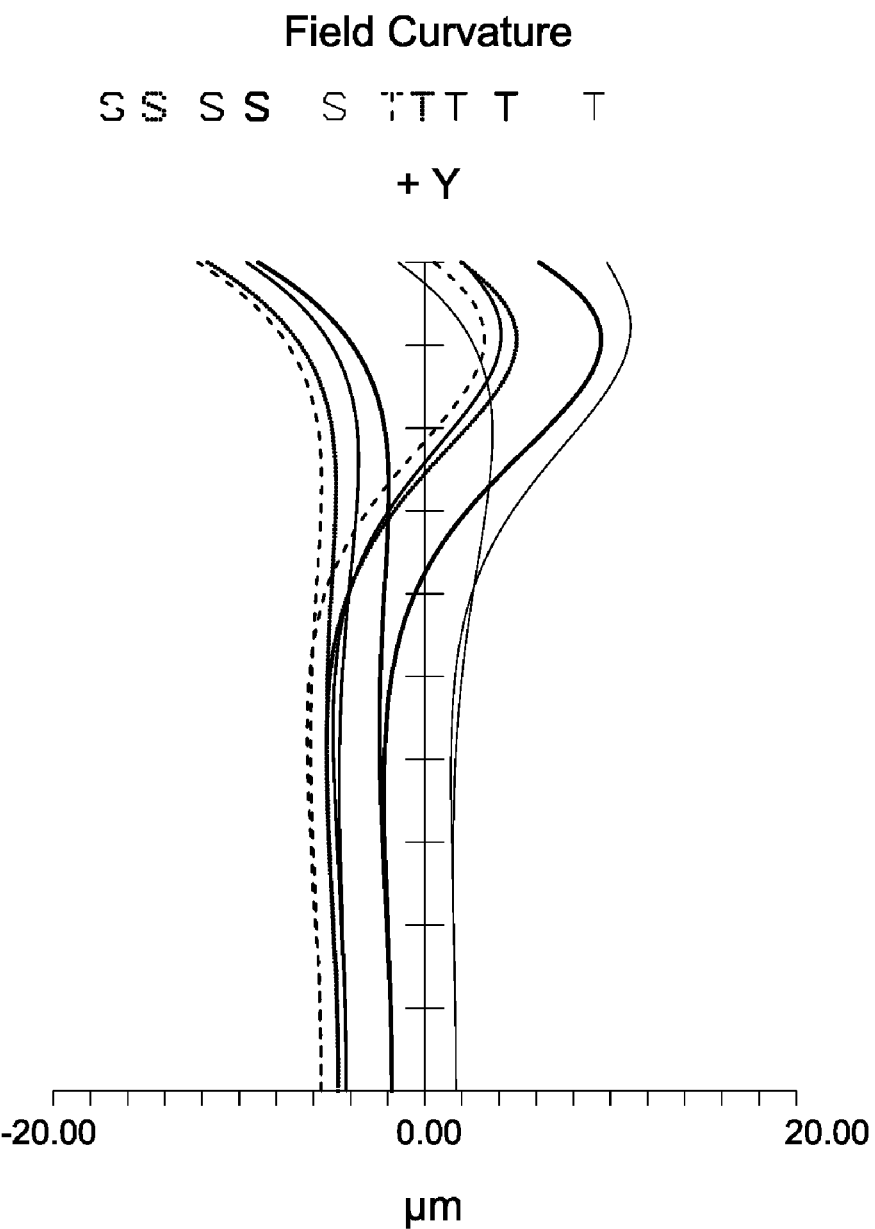
FIG. 2B is a schematic diagram illustrating the field curvature of the wide-angle lens assembly according to the first embodiment of the present disclosure.
Figure 2C:
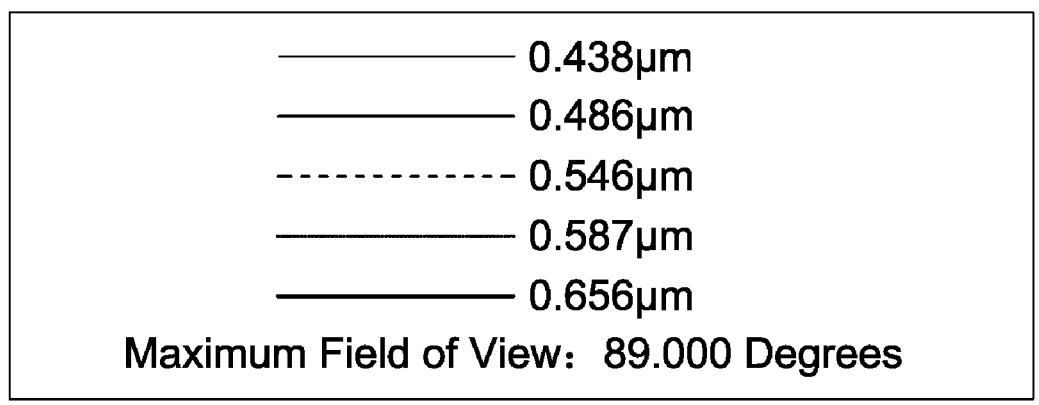
FIG. 2C is a schematic diagram illustrating the distortion of the wide-angle lens assembly according to the first embodiment of the present disclosure.
Figure 2C:
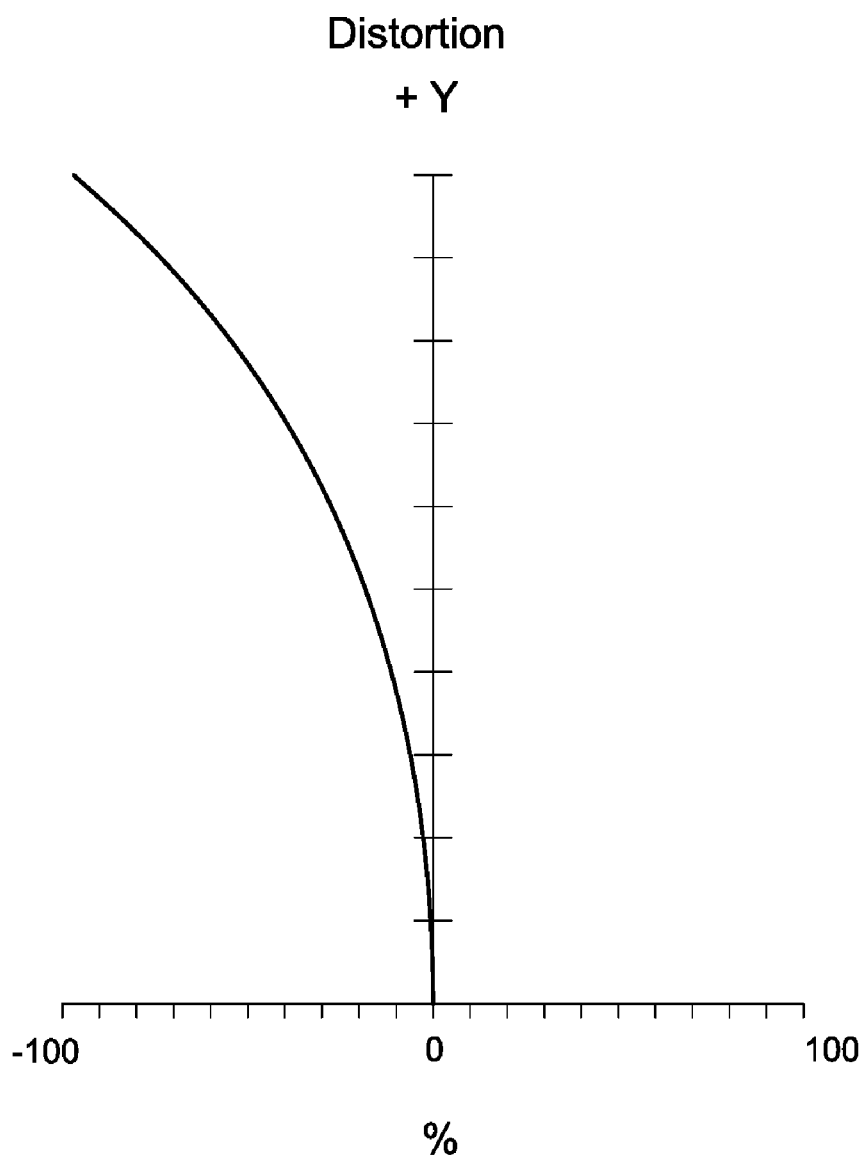

Moreover, it can be known from FIG. 2A to FIG. 2C that the wide-angle lens assembly 1 in the first embodiment can achieve the required optical performance. FIG. 2A is a schematic diagram illustrating the longitudinal aberration of the wide-angle lens assembly 1 according to the first embodiment of the present disclosure. FIG. 2B is a schematic diagram illustrating the field curvature of the wide-angle lens assembly 1 according to the first embodiment of the present disclosure. FIG. 2C is a schematic diagram illustrating the distortion of the wide-angle lens assembly 1 according to the first embodiment of the present disclosure.

As shown in FIG. 2A, the longitudinal aberration amount in the wide-angle lens assembly 1 in the first embodiment ranges from −0.012 mm to 0.008 mm for the reference wavelengths of 0.438 μm, 0.486 μm, 0.546 μm, 0.587 μm and 0.656 μm.

As shown in FIG. 2B, the field curvature amount in the wide-angle lens assembly 1 in the first embodiment ranges from −12 μm to 12 μm in the tangential direction and the sagittal direction for the reference wavelengths of 0.438 μm, 0.486 μm, 0.546 μm, 0.587 μm and 0.656 μm.

As shown in FIG. 2C, the five lines almost overlap so that only one line is presented. The distortion amount in the wide-angle lens assembly 1 in the first embodiment ranges from −100% to 0% for the reference wavelengths of 0.438 μm, 0.486 μm, 0.546 μm, 0.587 μm and 0.656 μm.

Accordingly, it may be appreciated that the longitudinal aberration, the field curvature and the distortion of the wide-angle lens assembly 1 in the first embodiment can be efficiently corrected to achieve preferred optical performance.

Figure 3:
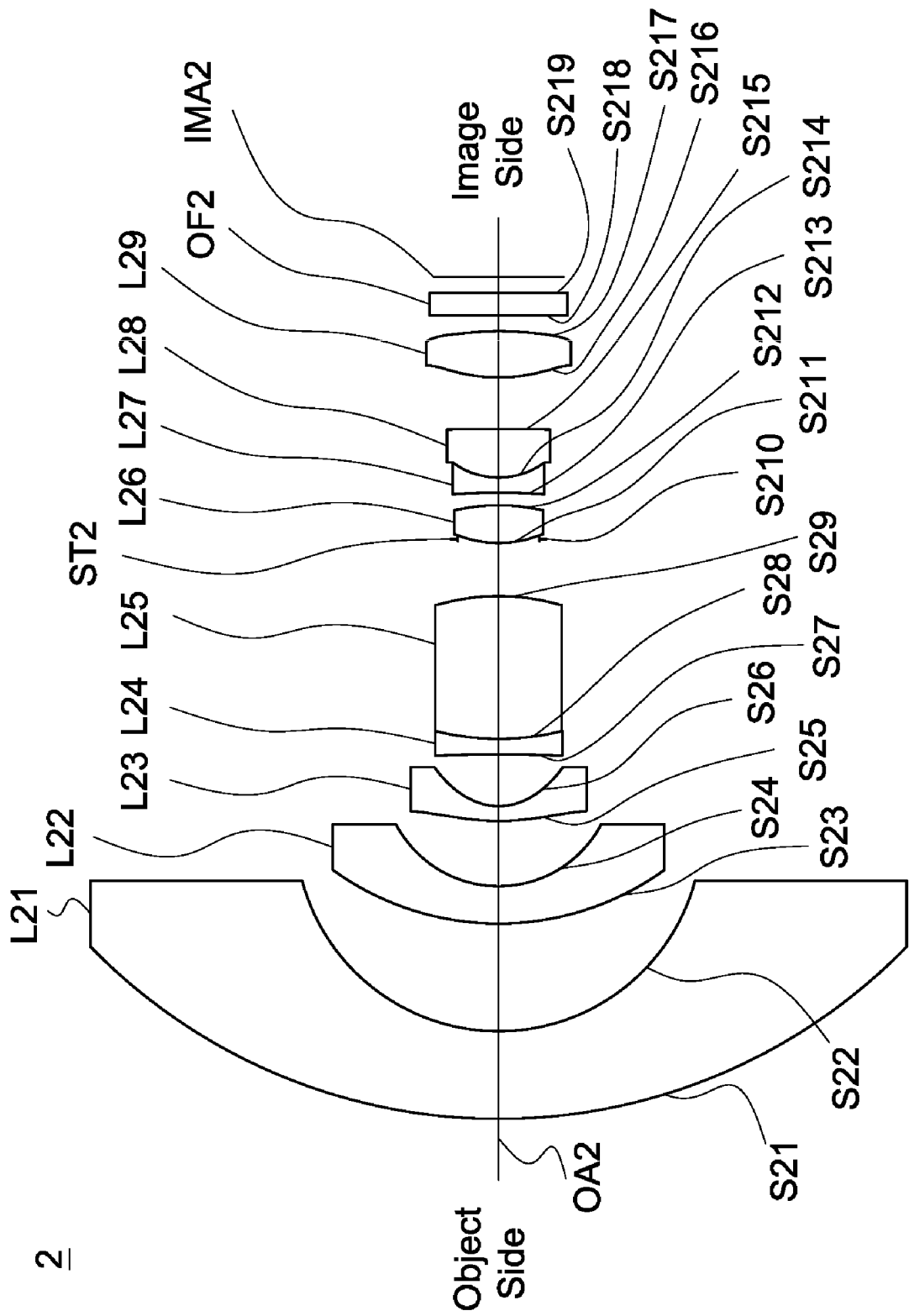
FIG. 3 is a schematic diagram illustrating the lens arrangement of a wide-angle lens assembly according to the second embodiment of the present disclosure.

Please refer to FIG. 3. FIG. 3 is a schematic diagram illustrating the lens arrangement of a wide-angle lens assembly according to the second embodiment of the present disclosure. The wide-angle lens assembly 2 includes a first lens L21, a second lens L22, a third lens L23, a fourth lens L24, a fifth lens L25, an aperture stop ST2, a sixth lens L26, a seventh lens L27, an eighth lens L28, a ninth lens L29 and an optical filter OF2, and these elements are arranged in order from an object side to an image side along an optical axis OA2. In operation, the light from the object side is imaged on an imaging surface IMA2.

The first lens L21 is a meniscus lens having negative refractive power and made of glass. The object-side surface S21 of the first lens L21 is a convex surface, and the image-side surface S22 of the first lens L21 is a concave surface. The object-side surface S21 and the image-side surface S22 are spherical surfaces.

The second lens L22 is a meniscus lens having negative refractive power and made of glass. The object-side surface S23 of the second lens L22 is a convex surface, and the image-side surface S24 of the second lens L22 is a concave surface. The object-side surface S23 and the image-side surface S24 are spherical surfaces.

The third lens L23 is a meniscus lens having negative refractive power and made of glass. The object-side surface S25 of the third lens L23 is a convex surface, and the image-side surface S26 of the third lens L23 is a concave surface. The object-side surface S25 and the image-side surface S26 are aspherical surfaces.

The fourth lens L24 is a biconcave lens having negative refractive power and made of glass. The object-side surface S27 of the fourth lens L24 is a concave surface, and the image-side surface S28 of the fourth lens L24 is a concave surface. The object-side surface S27 and the image-side surface S28 are spherical surfaces.

The fifth lens L25 is a biconvex lens having positive refractive power and made of glass. The object-side surface S28 of the fifth lens L25 is a convex surface, and the image-side surface S29 is a convex surface. The object-side surface S28 and the image-side surface S29 are spherical surfaces.

The fourth lens L24 and the fifth lens L25 are cemented together.

The sixth lens L26 is a biconvex lens having positive refractive power and made of glass. The object-side surface S211 of the sixth lens L26 is a convex surface, and the image-side surface S212 is a convex surface. The object-side surface S211 and the image-side surface S212 are aspherical surfaces.

The seventh lens L27 is a biconcave lens having negative refractive power and made of glass. The object-side surface S213 of the seventh lens L27 is a concave surface, and the image-side surface S214 is a concave surface. The object-side surface S213 and the image-side surface S214 are spherical surfaces.

The eighth lens L28 is a biconvex lens having positive refractive power and made of glass. The object-side surface S214 of the eighth lens L28 is a convex surface, and the image-side surface S215 of the eighth lens L28 is a convex surface. The object-side surface S214 and the image-side surface S215 are spherical surfaces.

The seventh lens L27 and the eighth lens L28 are cemented together.

The ninth lens L29 is a biconvex lens having positive refractive power and made of glass. The object-side surface S216 of the ninth lens L29 is a convex surface, and the image-side surface S217 is a convex surface. The object-side surface S216 and the image-side surface S217 are aspherical surfaces.

The object-side surface S218 and the image-side surface S219 of the optical filter OF2 are flat surfaces.

Furthermore, the wide-angle lens assembly 2 in the second embodiment satisfies one of the following conditions:

$$-15 < f2_1/f2 < -11.5 \quad (8)$$

$$-10 < f2_2/f2 < -5.5 \quad (9)$$

$$-5 < f2_3/f2 < -1.5 \quad (10)$$

$$4.5 < f2_9/f2 < 5.5 \quad (11)$$

$$-1.5 < f2_{123}/f2 < -1 \quad (12)$$

$$-2 < f2_{12345}/f2_{6789} < -1 \quad (13)$$

$$0.8 < TTL2/D2_1 < 1.2 \quad (14)$$

wherein the definitions of $f2_1$, $f2_2$, $f2_3$, $f2_9$, $f2$, $f2_{123}$, $f2_{12345}$, $f2_{6789}$, TTL2 and $D2_1$ are respectively the same as the definitions of $f1_1$, $f1_2$, $f1_3$, $f1_9$, $f1$, $f1_{123}$, $f1_{12345}$, $f1_{6789}$, TTL1 and $D1_1$ in the first embodiment, and thus, the related descriptions will be omitted hereafter.

Because of the disposition of the above lenses and the aperture stop ST2 and satisfying one of the conditions (8) to (14), the wide-angle lens assembly 2 may have a wider view angle, a minimized aperture value, a minimized total length and a minimized bore, and may also achieve the effective correction of aberration and be prevented from being effected by the variation in ambient temperature.

Table 4 illustrates the parameters of each lens in the wide-angle lens assembly 2 shown in FIG. 3. Here, the effective focal length of the wide-angle lens assembly 2 is 1.04 mm, the aperture value of the wide-angle lens assembly 2 is 2.0, the total length of the wide-angle lens assembly 2 is 26.6 mm, and the view angle of the wide-angle lens assembly 2 is 202 degrees.

TABLE 4

| Surface # | Curvature radius (mm) | thickness (mm) | Refractive index Nd | Abbe No. Vd | Note |
|---|---|---|---|---|---|
| S21 | 18.237 | 2.757 | 1.8 | 46.5 | First lens L21 |
| S22 | 6.487 | 3.420 | | | |
| S23 | 9.090 | 1.167 | 1.8 | 46.5 | Second lens L22 |
| S24 | 3.696 | 2.064 | | | |
| S25 | 6.480 | 0.470 | 1.74 | 44.9 | Third lens L23 |
| S26 | 1.849 | 1.643 | | | |
| S27 | −41.487 | 0.489 | 1.8 | 46.5 | Fourth lens L24 |
| S28 | 8.541 | 4.499 | 1.85 | 23.8 | Fifth lens L25 |

TABLE 4-continued

| Surface # | Curvature radius (mm) | thickness (mm) | Refractive index Nd | Abbe No. Vd | Note |
|---|---|---|---|---|---|
| S29 | −7.057 | 1.804 | | | |
| S210 | ∞ | −0.122 | | | Aperture stop ST2 |
| S211 | 3.703 | 1.191 | 1.61 | 57.5 | Sixth lens L26 |
| S212 | −5.267 | 0.404 | | | |
| S213 | −16.240 | 0.469 | 1.85 | 23.8 | Seventh lens L27 |
| S214 | 2.468 | 1.535 | 1.6 | 65.5 | Eighth lens L28 |
| S215 | −81.056 | 1.626 | | | |
| S216 | 5.444 | 1.461 | 1.61 | 58 | Ninth lens L29 |
| S217 | −8.526 | 0.500 | | | |
| S218 | ∞ | 0.700 | 1.52 | 64.2 | Optical filter OF2 |
| S219 | ∞ | 0.518 | | | |

The respective sag value z of the respective aspherical surface of the respective aspherical lens in Table 4 along the optical axis OA2 is expressed by the following equation:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

wherein c is the curvature of the surface, h is the distance between the optical axis and a point on the lens surface along a direction vertical to the optical axis, k is the conic coefficient, and A to G are the aspheric coefficients.

Table 5 illustrates the parameters of the respective aspherical surface of the respective aspherical lens listed in Table 4, wherein k is a conic constant, and A to G are the aspheric coefficients.

TABLE 5

| Surface # | k | A | B | C | D | E | F | G |
|---|---|---|---|---|---|---|---|---|
| S25 | −15.54 | −1.07E−03 | −8.20E−05 | −6.88E−06 | 1.84E−06 | −7.76E−08 | 0.00E+00 | 0.00E+00 |
| S26 | −0.77 | −2.96E−03 | 9.37E−04 | −4.29E−05 | −1.53E−05 | 4.46E−06 | 0.00E+00 | 0.00E+00 |
| S211 | 1.18 | −2.19E−03 | −2.74E−05 | 3.44E−04 | −2.62E−06 | −3.34E−05 | 0.00E+00 | 0.00E+00 |
| S212 | −1.89 | 7.12E−03 | −6.49E−04 | 7.55E−04 | −1.05E−04 | 9.89E−06 | 0.00E+00 | 0.00E+00 |
| S216 | −0.81 | 1.08E−03 | −9.16E−05 | −1.03E−04 | −4.50E−06 | 1.81E−06 | −8.34E−07 | 5.42E−09 |
| S217 | 7.33 | 9.01E−03 | −7.59E−04 | −2.55E−05 | 3.83E−07 | −7.45E−06 | 7.77E−07 | 3.13E+09 |

Table 6 illustrates the parameters for the conditions (8) to (14) and the calculation results of the conditions (8) to (14). From Table 6, the wide-angle lens assembly 2 in the second embodiment can satisfy the conditions (8) to (14).

TABLE 6

| $f2_1$ | −13.91 mm | $f2_2$ | −8.53 mm | $f2_3$ | −3.62 mm |
|---|---|---|---|---|---|
| $f2_9$ | 5.66 mm | $f2$ | 1.04 mm | $f2_{123}$ | −1.45 mm |
| $f2_{12345}$ | −6.44 mm | $f2_{6789}$ | 4.95 mm | TTL2 | 26.6 mm |
| $D2_1$ | 26 mm | | | | |
| $f2_1/f2$ | −13.4 | $f2_2/f2$ | −8.22 | $f2_3/f2$ | −3.48 |
| $f2_9/f2$ | 5.45 | $f2_{123}/f2$ | −1.40 | $f2_{12345}/f2_{6789}$ | −1.30 |
| $TTL2/D2_1$ | 1.02 | | | | |

Further, since sufficiently-strong refractive power may hardly be achieved if the calculation result of $f2_2/f2$ in the condition (9) is larger than −5.5, it would be better that the calculation result of $f2_2/f2$ is smaller than −5.5. Therefore, $-10 < f2_2/f2 < -5.5$ is a condition range that is capable of providing sufficiently-strong refractive power when it is satisfied.

Figure 4B:
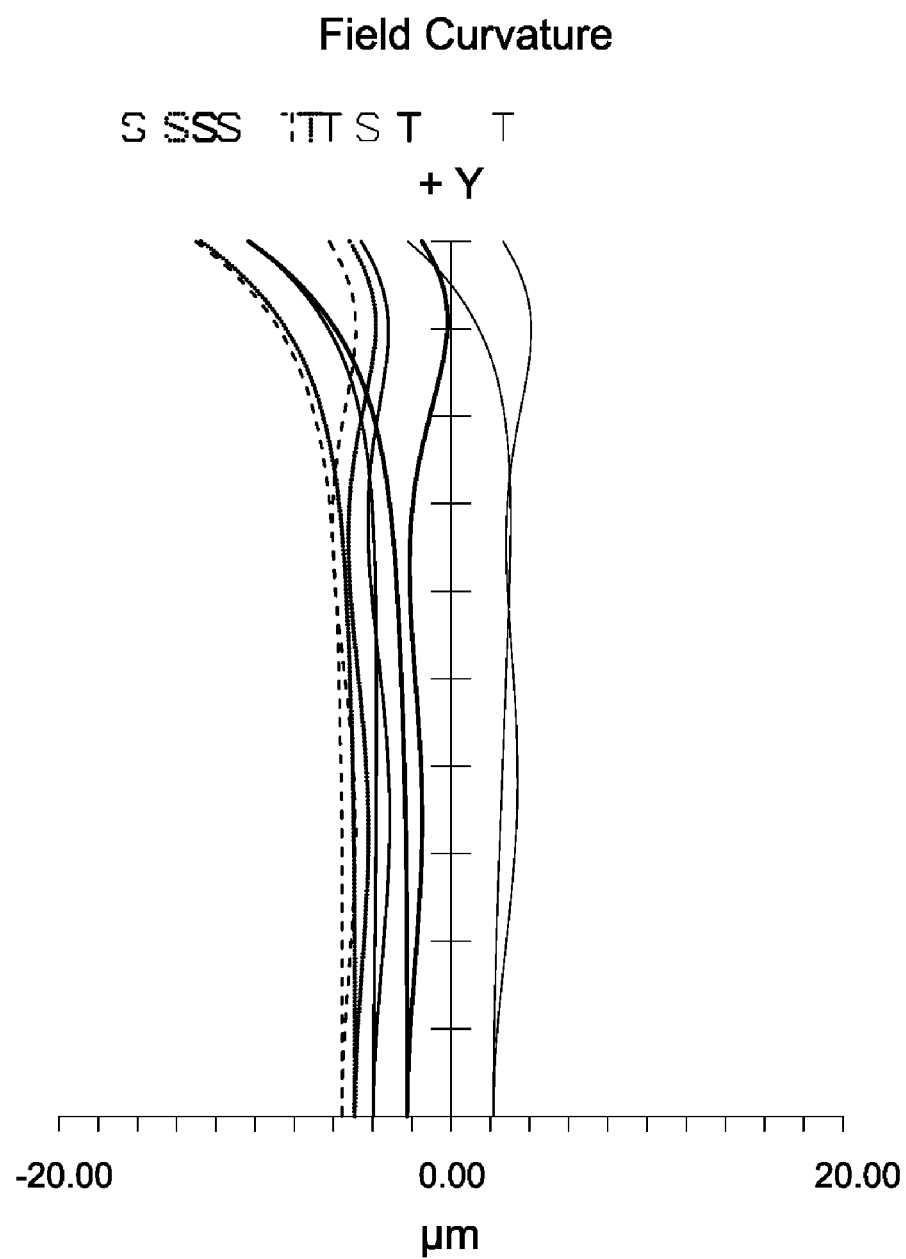
FIG. 4B is a schematic diagram illustrating the field curvature of the wide-angle lens assembly according to the second embodiment of the present disclosure.
Figure 4C:
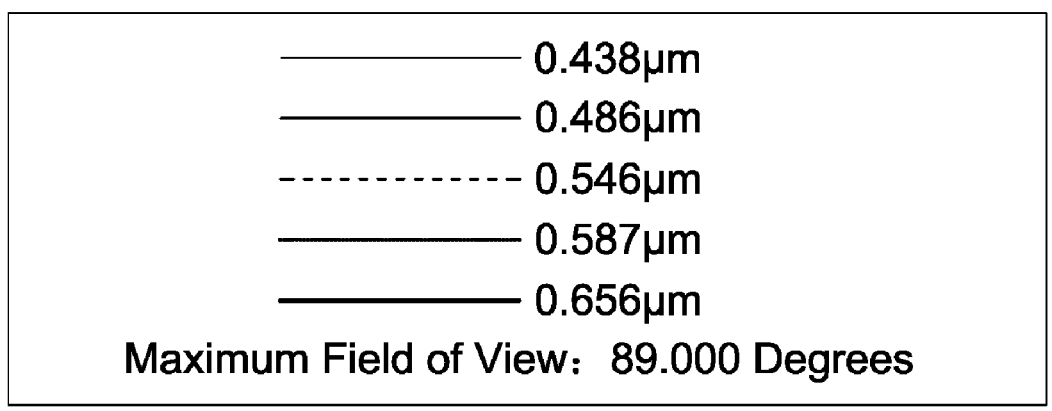
FIG. 4C is a schematic diagram illustrating the distortion of the wide-angle lens assembly according to the second embodiment of the present disclosure.
Figure 4C:
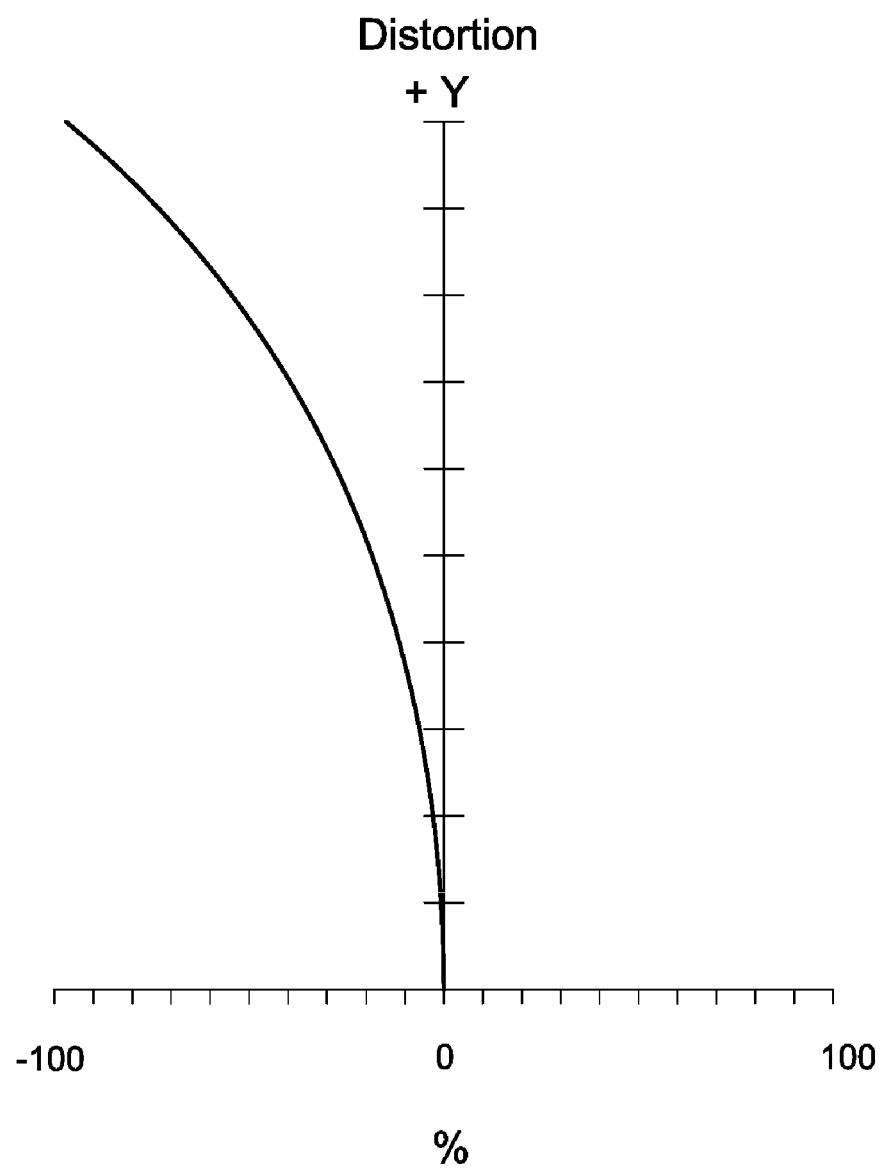

Moreover, it can be known from FIG. 4A to FIG. 4C that the wide-angle lens assembly 2 in the second embodiment can achieve the required optical performance. FIG. 4A is a schematic diagram illustrating the longitudinal aberration of the wide-angle lens assembly 2 according to the second embodiment of the present disclosure. FIG. 4B is a schematic diagram illustrating the field curvature of the wide-angle lens assembly 2 according to the second embodiment of the present disclosure. FIG. 4C is a schematic diagram illustrating the distortion of the wide-angle lens assembly 2 according to the second embodiment of the present disclosure.

As shown in FIG. 4A, the longitudinal aberration amount in the wide-angle lens assembly 2 in the second embodiment ranges from −0.010 mm to 0.024 mm for the reference wavelengths of 0.438 μm, 0.486 μm, 0.546 μm, 0.587 μm and 0.656 μm.

As shown in FIG. 4B, the field curvature amount in the wide-angle lens assembly 2 in the second embodiment ranges from −14 μm to 5 μm in the tangential direction and the sagittal direction for the reference wavelengths of 0.438 μm, 0.486 μm, 0.546 μm, 0.587 μm and 0.656 μm.

As shown in FIG. 4C, the five lines almost overlap so that only one line is presented. The distortion amount in the wide-angle lens assembly 2 in the second embodiment ranges from −100% to 0% for the reference wavelengths 0.438 μm, 0.486 μm, 0.546 μm, 0.587 μm and 0.656 μm.

Accordingly, it may be appreciated that the longitudinal aberration, the field curvature and the distortion of the wide-angle lens assembly 2 in the second embodiment can be efficiently corrected to achieve preferred optical performance.

Figure 5:
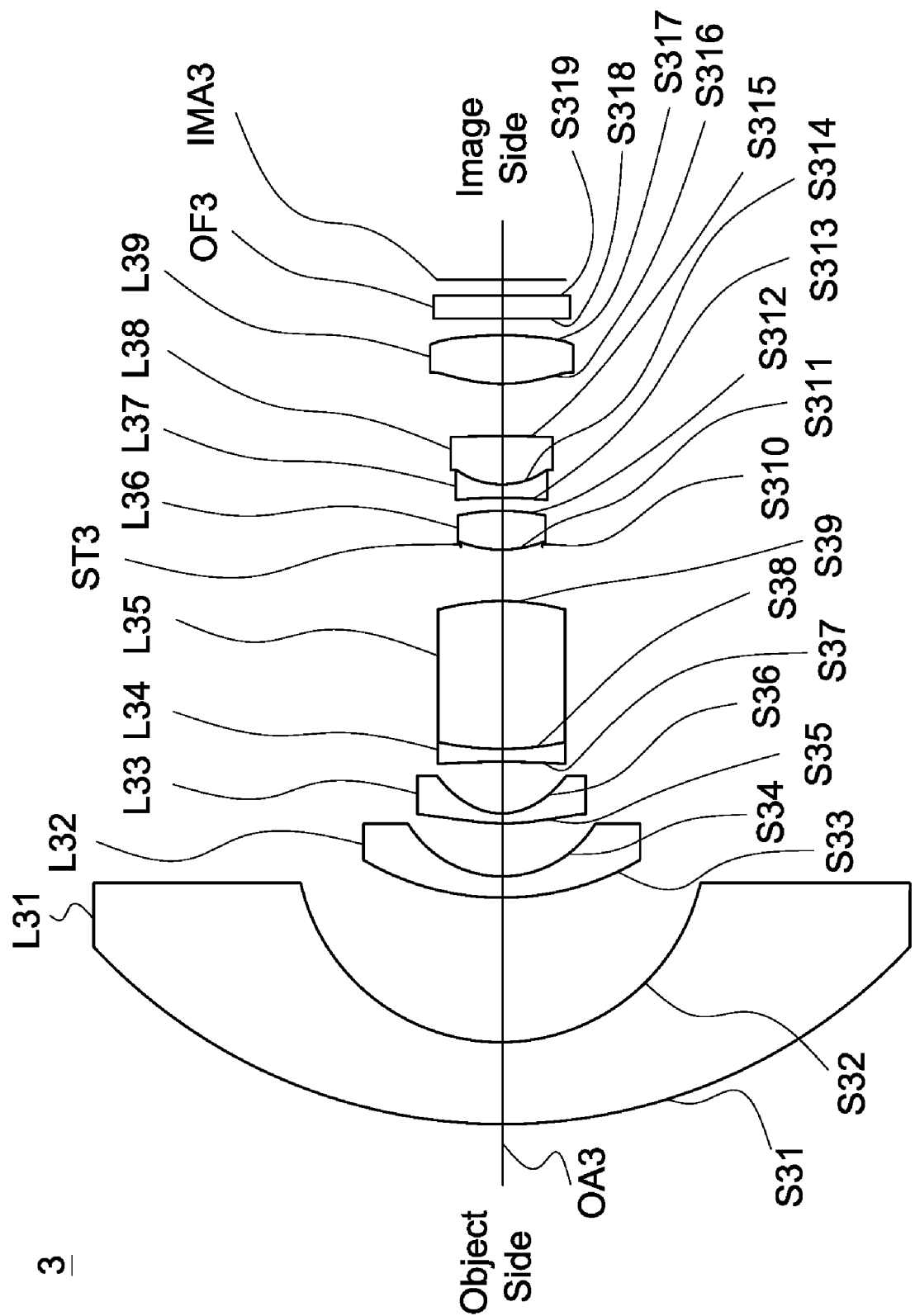
FIG. 5 is a schematic diagram illustrating the lens arrangement of a wide-angle lens assembly according to the third embodiment of the present disclosure.

Please refer to FIG. 5. FIG. 5 is a schematic diagram illustrating the lens arrangement of a wide-angle lens assembly according to the third embodiment of the present disclosure. The wide-angle lens assembly 3 includes a first lens L31, a second lens L32, a third lens L33, a fourth lens L34, a fifth lens L35, an aperture stop ST3, a sixth lens L36, a seventh lens L37, an eighth lens L38, a ninth lens L39 and an optical filter OF3, and these elements are arranged in order from an object side to an image side along an optical axis OA3. In operation, the light from the object side is imaged on an imaging surface IMA3.

The first lens L31 is a meniscus lens having negative refractive power and made of glass. The object-side surface S31 of the first lens L31 is a convex surface, and the image-side surface S32 is a concave surface. The object-side surface S31 and the image-side surface S32 are spherical surfaces.

The second lens L32 is a meniscus lens having negative refractive power and made of glass. The object-side surface S33 of the second lens L32 is a convex surface, and the image-side surface S34 of the second lens L32 is a concave surface. The object-side surface S33 and the image-side surface S34 are spherical surfaces.

The third lens L33 is a meniscus lens having negative refractive power and made of glass. The object-side surface S35 of the third lens L33 is a convex surface, and the image-side surface S36 is a concave surface. The object-side surface S35 and the image-side surface S36 are aspherical surfaces.

The fourth lens L34 is a biconcave lens having negative refractive power and made of glass. The object-side surface S37 of the fourth lens L34 is a concave surface, and the image-side surface S38 is a concave surface. The object-side surface S37 and the image-side surface S38 are spherical surfaces.

The fifth lens L35 is a biconvex lens having positive refractive power and made of glass. The object-side surface S38 of the fifth lens L35 is a convex surface, and the image-side surface S39 of the fifth lens L35 is a convex surface. The object-side surface S38 and the image-side surface S39 are spherical surfaces.

The fourth lens L34 and the fifth lens L35 are cemented together.

The sixth lens L36 is a biconvex lens having positive refractive power and made of glass. The object-side surface S311 of the sixth lens L36 is a convex surface, and the image-side surface S312 is a convex surface. The object-side surface S311 and the image-side surface S312 are aspherical surfaces.

The seventh lens L37 is a biconcave lens having negative refractive power and made of glass. The object-side surface S313 of the seventh lens L37 is a concave surface, and the image-side surface S314 of the seventh lens L37 is a concave surface. The object-side surface S313 and the image-side surface S314 are spherical surfaces.

The eighth lens L38 is a biconvex lens having positive refractive power and made of glass. The object-side surface S314 of the eighth lens L38 is a convex surface, and the image-side surface S315 of the eighth lens L38 is a convex surface. The object-side surface S314 and the image-side surface S315 are spherical surfaces.

The seventh lens L37 and the eighth lens L38 are cemented together.

The ninth lens L39 is a biconvex lens having positive refractive power and made of glass. The object-side surface S316 of the ninth lens L39 is a convex surface, and the image-side surface S317 of the ninth lens L39 is a convex surface. The object-side surface S316 and the image-side surface S317 are aspherical surfaces.

The object-side surface S318 and the image-side surface S319 of the optical filter OF3 are flat surfaces.

Moreover, the wide-angle lens assembly 3 in the third embodiment satisfies one of the following conditions:

$$-15 < f3_1/f3 < -11.5 \tag{15}$$

$$-10 < f3_2/f3 < -5.5 \tag{16}$$

$$-5 < f3_3/f3 < -1.5 \tag{17}$$

$$4.5 < f3_9/f3 < 5.5 \tag{18}$$

$$-1.5 < f3_{123}/f3 < -1 \tag{19}$$

$$-2 < f3_{12345}/f3_{6789} < -1 \tag{20}$$

$$0.8 < TTL3/D3_1 < 1.2 \tag{21}$$

wherein the definitions of $f3_1$, $f3_2$, $f3_3$, $f3_9$, $f3$, $f3_{123}$, $f3_{12345}$, $f3_{6789}$, TTL3 and $D3_1$ are respectively the same as the definitions of $f1_1$, $f1_2$, $f1_3$, $f1_9$, $f1$, $f1_{123}$, $f1_{12345}$, $f1_{6789}$, TTL1 and $D1_1$ in the first embodiment, and thus, the related descriptions will be omitted hereafter.

Because of the disposition of the above lenses and the aperture stop ST3 and satisfying one of the conditions (15) to (21), the wide-angle lens assembly 3 may have a wider view angle, a minimized aperture value, a minimized total length and a minimized bore, and may also achieve the effective correction of aberration and be prevented from being effected by the variation in ambient temperature.

Table 7 illustrates the parameters of each lens in the wide-angle lens assembly 3 shown in FIG. 5. Here, the effective focal length of the wide-angle lens assembly 3 is 1.00 mm, the aperture value of the wide-angle lens assembly 3 is 2.0, the total length of the wide-angle lens assembly 3 is 25.7 mm, and the view angle of the wide-angle lens assembly 3 is 201 degrees.

TABLE 7

| Surface # | Curvature radius (mm) | thickness (mm) | Refractive index Nd | Abbe No. Vd | Note |
|---|---|---|---|---|---|
| S31 | 17.137 | 2.497 | 1.83 | 42.7 | First lens L31 |
| S32 | 6.336 | 4.402 | | | |
| S33 | 8.375 | 0.647 | 1.8 | 46.6 | Second lens L32 |
| S34 | 3.367 | 1.617 | | | |
| S35 | 6.418 | 0.300 | 1.73 | 54.7 | Third lens L33 |
| S36 | 1.853 | 1.573 | | | |
| S37 | −30.930 | 0.390 | 1.8 | 46.6 | Fourth lens L34 |
| S38 | 9.325 | 4.496 | 1.92 | 24 | Fifth lens L35 |
| S39 | −7.401 | 1.729 | | | |
| S310 | ∞ | −0.162 | | | Aperture stop ST3 |
| S311 | 3.630 | 1.187 | 1.61 | 57.5 | Sixth lens L36 |
| S312 | −5.380 | 0.391 | | | |
| S313 | −16.702 | 0.410 | 1.85 | 23.8 | Seventh lens L37 |
| S314 | 2.388 | 1.463 | 1.62 | 63.4 | Eighth lens L38 |
| S315 | −93.248 | 1.603 | | | |
| S316 | 5.036 | 1.480 | 1.62 | 58.1 | Ninth lens L39 |
| S317 | −9.341 | 0.500 | | | |
| S318 | ∞ | 0.700 | 1.52 | 64.2 | Optical filter OF3 |
| S319 | ∞ | 0.481 | | | |

The respective sag value z of the respective aspherical surface of the respective aspherical lens in Table 7 along the optical axis OA3 is expressed by the following equation:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

wherein c is the curvature of the surface, h is the distance between the optical axis and a point on the lens surface along a direction vertical to the optical axis, k is the conic coefficient, and A to G are the aspheric coefficients.

Table 8 illustrates the parameters of the aspherical surface of the respective aspherical lens listed in Table 7, wherein k is the conic constant, and A to G are the aspheric coefficients.

TABLE 8

| Surface # | k | A | B | C | D | E | F | G |
|---|---|---|---|---|---|---|---|---|
| S35 | −17.84 | −1.38E−03 | −7.27E−05 | −7.16E−06 | 1.68E−06 | −4.53E−08 | 0.00E+00 | 0.00E+00 |
| S36 | −0.77 | −3.49E−03 | 1.21E−03 | −5.73E−05 | −2.04E−05 | 5.09E−06 | 0.00E+00 | 0.00E+00 |
| S311 | 1.22 | −2.15E−03 | 1.77E−04 | 4.10E−04 | −7.32E−07 | −5.03E−05 | 0.00E+00 | 0.00E+00 |
| S312 | −2.20 | 7.38E−03 | −3.91E−04 | 8.66E−04 | −1.08E−04 | 8.27E−06 | 0.00E+00 | 0.00E+00 |
| S316 | −1.38 | 5.33E−04 | −1.96E−04 | −1.14E−04 | −5.09E−06 | 1.88E−06 | −8.35E−07 | −2.14E−08 |
| S317 | 9.91 | 7.18E−03 | −8.83E−04 | −3.06E−05 | 1.47E−06 | −7.15E−06 | 8.01E−07 | −4.71E+09 |

Table 9 illustrates the parameters for the conditions (15) to (21) and the calculation results of the conditions (15) to (21). From Table 9, the wide-angle lens assembly 3 in the third embodiment can satisfy the conditions (15) to (21).

TABLE 9

| $f3_1$ | −13.39 mm | $f3_2$ | −7.39 mm | $f3_3$ | −3.66 mm |
|---|---|---|---|---|---|
| $f3_9$ | 5.45 mm | $f3$ | 1.00 mm | $f3_{123}$ | −1.39 mm |
| $f3_{12345}$ | −6.22 mm | $f3_{6789}$ | 4.76 mm | TTL3 | 25.7 mm |
| $D3_1$ | 25.0 mm | | | | |
| $f3_1/f3$ | −13.40 | $f3_2/f3$ | −7.40 | $f3_3/f3$ | −3.66 |
| $f3_9/f3$ | 5.45 | $f3_{123}/f3$ | −1.39 | $f3_{12345}/f3_{6789}$ | −1.31 |
| $TTL3/D3_1$ | 1.03 | | | | |

Further, since sufficiently-strong refractive power may hardly be achieved if the calculation result of $f3_3/f3$ in the condition (17) is larger than −1.5, it would be better that the calculation result of $f3_3/f3$ is smaller than −1.5. Therefore, $-5 < f3_3/f3 < -1.5$ is a condition range that is capable of providing sufficiently-strong refractive power when it is satisfied.

Figure 6A:
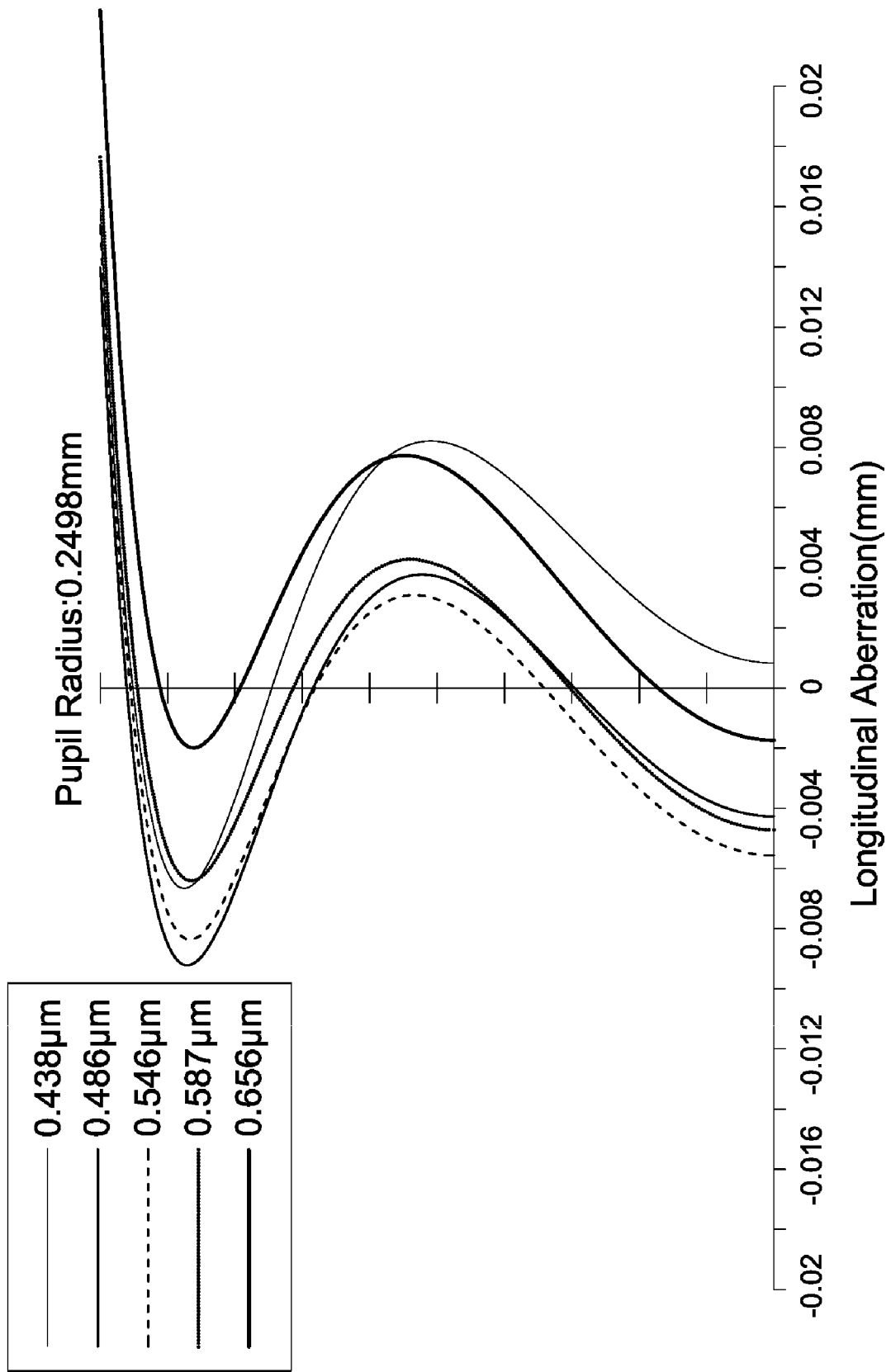
FIG. 6A is a schematic diagram illustrating the longitudinal aberration of the wide-angle lens assembly according to the third embodiment of the present disclosure.
Figure 6B:
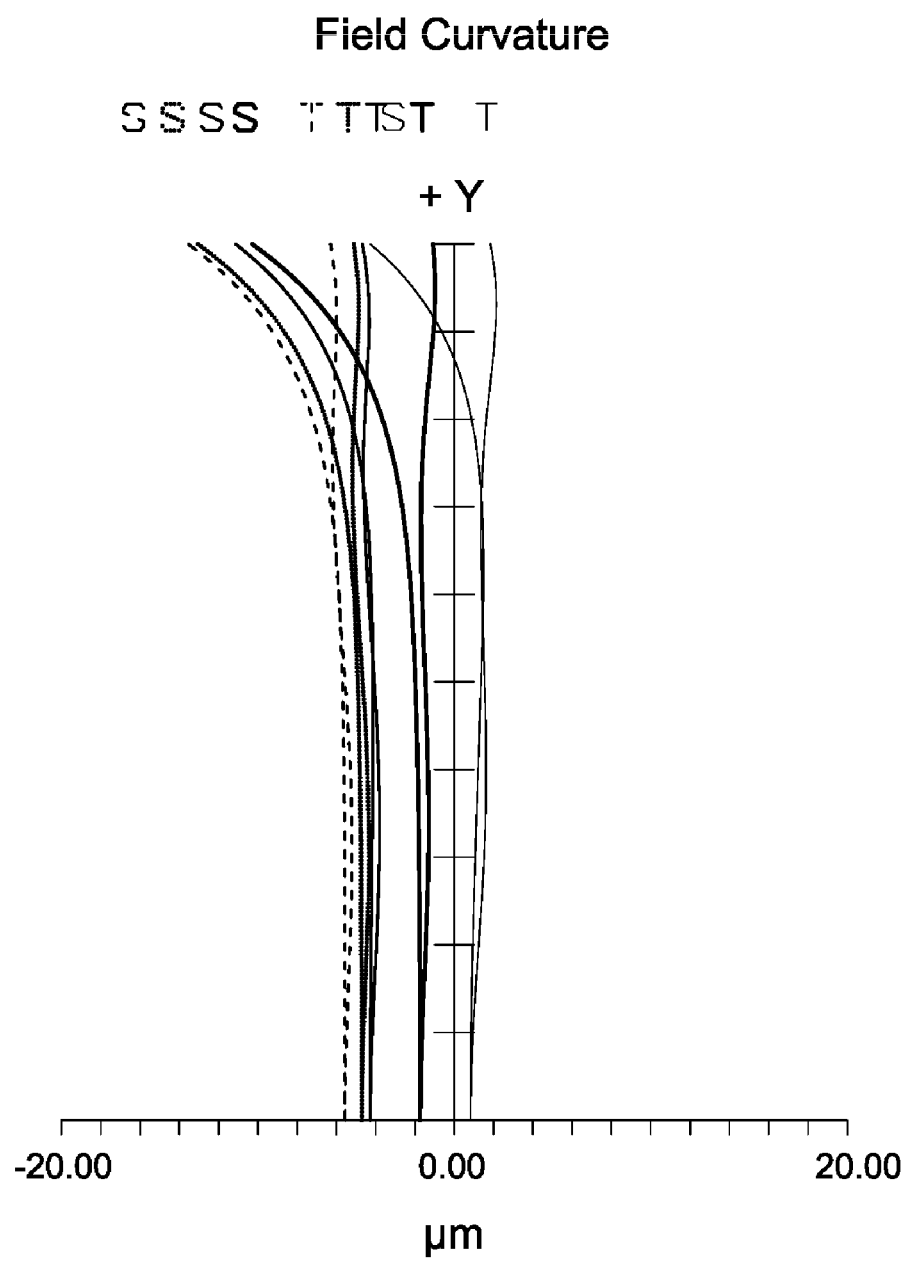
FIG. 6B is a schematic diagram illustrating the field curvature of the wide-angle lens assembly according to the third embodiment of the present disclosure.
Figure 6C:
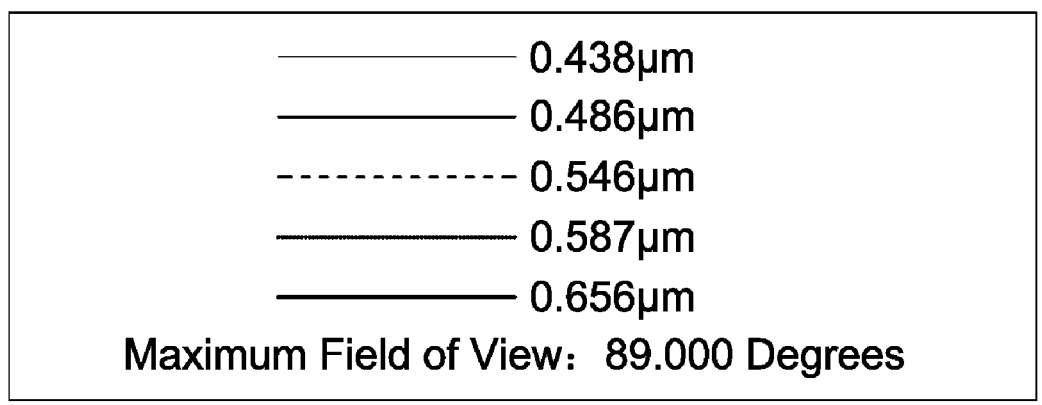
FIG. 6C is a schematic diagram illustrating the distortion of the wide-angle lens assembly according to the third embodiment of the present disclosure.
Figure 6C:
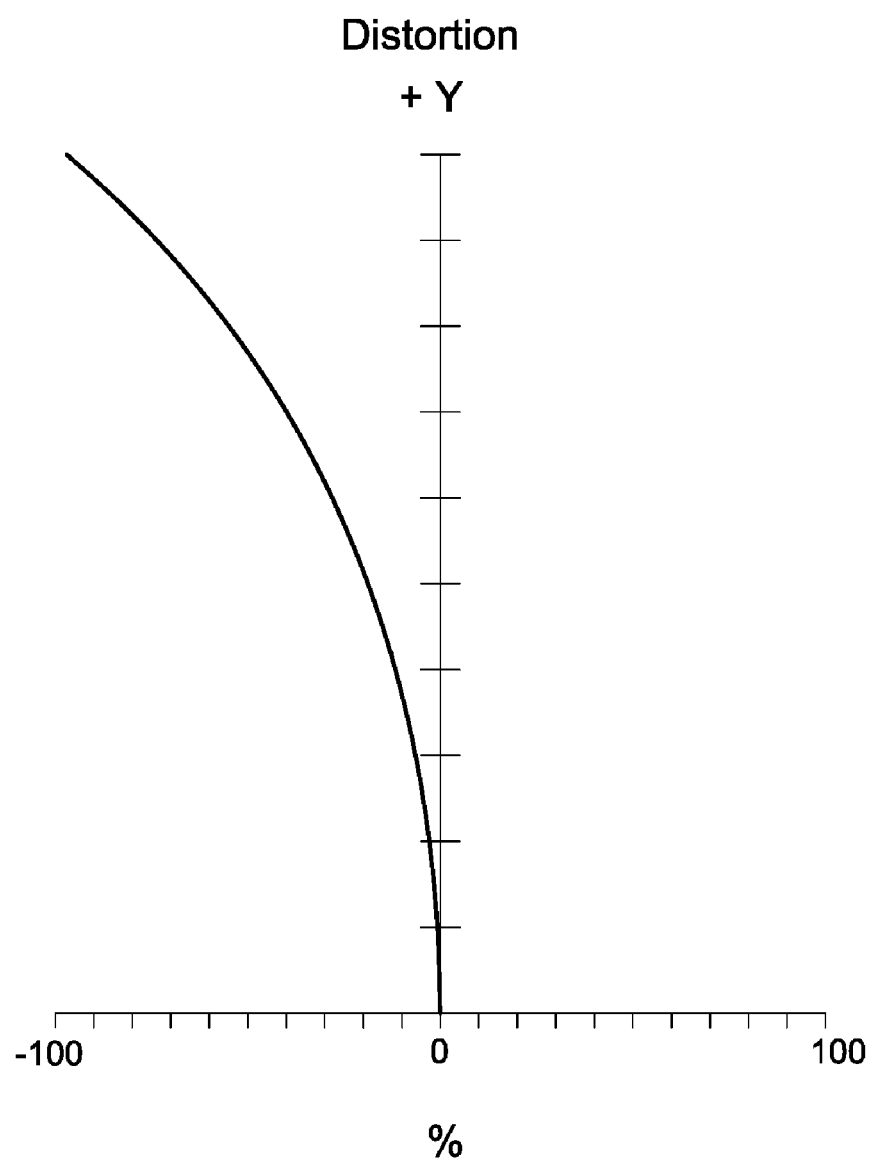

Moreover, it can be known from FIG. 6A to FIG. 6C that the wide-angle lens assembly 3 in the third embodiment can achieve the required optical performance. FIG. 6A is a schematic diagram illustrating the longitudinal aberration of the wide-angle lens assembly 3 according to the third embodiment of the present disclosure. FIG. 6B is a schematic diagram illustrating the field curvature of the wide-angle lens assembly 3 according to the third embodiment of the present disclosure. FIG. 6C is a schematic diagram illustrating the distortion of the wide-angle lens assembly 3 according to the third embodiment of the present disclosure.

As shown in FIG. 6A, the longitudinal aberration amount in the wide-angle lens assembly 3 in the third embodiment ranges from −0.010 mm to 0.023 mm for the reference wavelengths of 0.438 μm, 0.486 μm, 0.546 μm, 0.587 μm and 0.656 μm.

As shown in FIG. 6B, the tangential direction and the sagittal direction the field curvature amount in the wide-angle lens assembly 3 in the third embodiment ranges from −14 μm to 3 μm for the reference wavelengths of 0.438 μm, 0.486 μm, 0.546 μm, 0.587 μm and 0.656 μm.

As shown in FIG. 6C, the five lines almost overlap so that only one line is presented. The distortion amount in the wide-angle lens assembly 3 in the third embodiment ranges from −100% to 0% for the reference wavelengths 0.438 μm, 0.486 μm, 0.546 μm, 0.587 μm and 0.656 μm.

Accordingly, it may be appreciated that the longitudinal aberration, the field curvature and the distortion of the wide-angle lens assembly 3 in the third embodiment can be efficiently corrected to achieve preferred optical performance.

Even though the primary conditions to be satisfied in the present disclosure are $-15 < f_1/f < -11.5$, $-10 < f_2/f < -5.5$ and $-5 < f_3/f < -1.5$, this embodiment also satisfies the other conditions. The sufficiently-strong refractive power may be achieved when the conditions $-15 < f_1/f < -11.5$, $-10 < f_2/f < -5.5$ and $-5 < f_3/f < -1.5$ are satisfied.

It should be understood that although the present disclosure has been described with reference to the above preferred embodiments, these embodiments are not intended to retrain the present disclosure. It will be apparent to one of ordinary skill in the art that various changes or modifications to the described embodiments can be made without departing from the spirit of the present disclosure. Accordingly, the scope of the present disclosure is defined by the attached claims.

What is claimed is:

1. A wide-angle lens assembly, consisting of:
   a first lens having negative refractive power, and the first lens comprising a concave surface facing an image side;
   a second lens having negative refractive power, and the second lens comprising a concave surface facing the image side;

a third lens having negative refractive power, and the third lens comprising a concave surface facing the image side;
a fourth lens having refractive power;
a fifth lens having refractive power;
a sixth lens having positive refractive power, and the sixth lens being a biconvex lens;
a seventh lens having refractive power;
an eighth lens having refractive power; and
a ninth lens having positive refractive power, and the ninth lens being a biconvex lens;
wherein the wide-angle lens assembly satisfies:

$0.8 < TTL/D_1 < 1.2;$ wherein TTL is a distance between an object-side surface of the first lens and an imaging surface along the optical axis, and $D_1$ is an effective diameter of the first lens; and
wherein the first lens, the second lens, the third lens, the fourth lens, the fifth lens, the sixth lens, the seventh lens, the eighth lens and the ninth lens are arranged in order from an object side to the image side along an optical axis.

2. The wide-angle lens assembly as claimed in claim 1, wherein the wide-angle lens assembly further satisfies:

$-15 < f_1/f < -11.5;$ wherein $f_1$ is a focal length of the first lens, and f is an effective focal length of the wide-angle lens assembly.

3. The wide-angle lens assembly as claimed in claim 2, wherein the wide-angle lens assembly further satisfies:

$-10 < f_2/f < -5.5;$ wherein $f_2$ is a focal length of the second lens, and f is an effective focal length of the wide-angle lens assembly.

4. The wide-angle lens assembly as claimed in claim 3, wherein the wide-angle lens assembly further satisfies:

$-5 < f_3/f < -1.5;$ wherein $f_3$ is a focal length of the third lens, and f is an effective focal length of the wide-angle lens assembly.

5. The wide-angle lens assembly as claimed in claim 4, wherein the wide-angle lens assembly further satisfies:

$-1.5 < f_{123}/f < -1;$ wherein $f_{123}$ is an effective focal length of a combination of the first lens, the second lens and the third lens, and f is an effective focal length of the wide-angle lens assembly.

6. The wide-angle lens assembly as claimed in claim 1, wherein the wide-angle lens assembly further satisfies:

$4.5 < f_9/f < 5.5;$ wherein $f_9$ is a focal length of the ninth lens, and f is an effective focal length of the wide-angle lens assembly.

7. The wide-angle lens assembly as claimed in claim 1, wherein the wide-angle lens assembly further satisfies:

$-2 < f_{12345}/f_{6789} < -1;$ wherein $f_{12345}$ is an effective focal length of a combination of the first lens, the second lens, the third lens, the fourth lens and the fifth lens, and $f_{6789}$ is an effective focal length of a combination of the sixth lens, the seventh lens, the eighth lens and the ninth lens.

8. The wide-angle lens assembly as claimed in claim 1, wherein the fourth lens and the fifth lens are cemented together.

9. The wide-angle lens assembly as claimed in claim 1, wherein the seventh lens and the eighth lens are cemented together.

10. The wide-angle lens assembly as claimed in claim 1, wherein the eighth lens further comprises a flat surface facing the image side.

11. The wide-angle lens assembly as claimed in claim 1, wherein the third lens, the sixth lens and the ninth lens are aspheric lenses.

12. A wide-angle lens assembly, consisting of:
a first lens having negative refractive power, and the first lens comprising a concave surface facing an image side;
a second lens having negative refractive power, and the second lens comprising a concave surface facing the image side;
a third lens having negative refractive power, and the third lens comprising a concave surface facing the image side;
a fourth lens having refractive power;
a fifth lens having refractive power;
a sixth lens having positive refractive power, and the sixth lens being a biconvex lens;
a seventh lens having refractive power;
an eighth lens having refractive power; and
a ninth lens having positive refractive power, and the ninth lens being a biconvex lens;
wherein the wide-angle lens assembly satisfies:

$4.5 < f_9/f < 5.5;$ wherein $f_9$ is a focal length of the ninth lens, and f is an effective focal length of the wide-angle lens assembly; and
wherein the first lens, the second lens, the third lens, the fourth lens, the fifth lens, the sixth lens, the seventh lens, the eighth lens and the ninth lens are arranged in order from an object side to the image side along an optical axis.

13. The wide-angle lens assembly as claimed in claim 12, wherein the wide-angle lens assembly further satisfies:

$-15 < f_1/f < -11.5;$ $-1.5 < f_{123}/f < -1;$ wherein $f_1$ is a focal length of the first lens, $f_{123}$ is an effective focal length of a combination of the first lens, the second lens and the third lens, and f is an effective focal length of the wide-angle lens assembly.

14. The wide-angle lens assembly as claimed in claim 13, wherein the wide-angle lens assembly further satisfies:

$-10 < f_2/f < -5.5;$ wherein $f_2$ is a focal length of the second lens, and f is an effective focal length of the wide-angle lens assembly.

15. The wide-angle lens assembly as claimed in claim 14, wherein the wide-angle lens assembly further satisfies:

$-5 < f_3/f < -1.5;$ wherein $f_3$ is a focal length of the third lens, and f is an effective focal length of the wide-angle lens assembly.

16. The wide-angle lens assembly as claimed in claim 12, wherein the wide-angle lens assembly further satisfies:

$0.8 < TTL/D_1 < 1.2;$ wherein TTL is a distance between an object-side surface of the first lens and an imaging surface along the optical axis, and $D_1$ is an effective diameter of the first lens.

17. The wide-angle lens assembly as claimed in claim 12, wherein the wide-angle lens assembly further satisfies:

$$-2 < f_{12345}/f_{6789} < -1;$$

wherein $f_{12345}$ is an effective focal length of a combination of the first lens, the second lens, the third lens, the fourth lens and the fifth lens, and $f_{6789}$ is an effective focal length of a combination of the sixth lens, the seventh lens, the eighth lens and the ninth lens.

18. The wide-angle lens assembly as claimed in claim 12, wherein the fourth lens and the fifth lens are cemented together, and the seventh lens and the eighth lens are cemented together.

19. The wide-angle lens assembly as claimed in claim 12, wherein the third lens, the sixth lens and the ninth lens are aspheric lenses.

20. A wide-angle lens assembly, consisting of:
a first lens having negative refractive power, and the first lens comprising a concave surface facing an image side;
a second lens having negative refractive power, and the second lens comprising a concave surface facing the image side;
a third lens having negative refractive power, and the third lens comprising a concave surface facing the image side;
a fourth lens having refractive power;
a fifth lens having refractive power;
a sixth lens having positive refractive power, and the sixth lens being a biconvex lens;
a seventh lens having refractive power;
an eighth lens having refractive power, and the eighth lens comprising a flat surface facing the image side; and
a ninth lens having positive refractive power, and the ninth lens being a biconvex lens;
wherein the first lens, the second lens, the third lens, the fourth lens, the fifth lens, the sixth lens, the seventh lens, the eighth lens and the ninth lens are arranged in order from an object side to the image side along an optical axis; and
wherein the wide-angle lens assembly satisfies: $4.5 < f_9/f < 5.5$;
wherein $f_9$ is a focal length of the ninth lens, and f is an effective focal length of the wide-angle lens assembly.

* * * * *